United States Patent [19]

Itaba et al.

[11] Patent Number: 4,590,020

[45] Date of Patent: May 20, 1986

[54] METHOD OF PRODUCING ORIENTED POLYETHYLENE FILM

[75] Inventors: Yasushi Itaba, Tokyo; Keichiro Saito; Jyoichi Tabuchi, both of Saitama; Masao Yoshizawa, Tokyo, all of Japan

[73] Assignee: Toa Nenryo Kogyo Kabushiki Kaisha, Tokyo, Japan

[21] Appl. No.: 592,321

[22] Filed: Mar. 22, 1984

[30] Foreign Application Priority Data

Mar. 23, 1983 [JP] Japan .................................. 58-47107
Mar. 23, 1983 [JP] Japan .................................. 58-47108

[51] Int. Cl.⁴ .................... B29C 35/02; B29C 35/10; B29C 55/02
[52] U.S. Cl. ..................................... 264/22; 264/171; 264/210.2; 264/288.8; 264/289.3; 156/229; 156/244.12; 156/244.24; 156/275.5; 525/191; 525/194; 522/161
[58] Field of Search ................. 428/216, 333, 516, 36, 428/910; 264/289.3, 22, 171, 288.8, 210.2; 156/229, 244.24, 273.3, 273.5, 275.5, 244.12; 204/159.15, 159.17; 525/326.1, 191, 387, 194

[56] References Cited

U.S. PATENT DOCUMENTS

| | | | |
|---|---|---|---|
| 2,877,500 | 3/1959 | Rainer et al. | 264/22 |
| 3,242,159 | 3/1966 | Kaufman | 525/387 X |
| 3,455,337 | 7/1969 | Cook | 204/159.17 X |
| 4,064,296 | 12/1977 | Bornstein et al. | 428/35 |
| 4,226,905 | 10/1980 | Harbourne | 264/22 |

FOREIGN PATENT DOCUMENTS 2067132 7/1981 United Kingdom ................ 428/516

OTHER PUBLICATIONS

Modern Plastics Encyclopedia, vol. 57 (10A), McGraw-Hill, Inc., N.Y., N.Y. (1980), pp. 550-551.

Primary Examiner—Joseph L. Schofer
Assistant Examiner—Fred M. Teskin
Attorney, Agent, or Firm—R. L. Graham

[57] ABSTRACT

An oriented film is prepared by crosslinking a sheet of HDPE to provide maximum crosslinking at the surfaces of the sheet and minimum orientation at its middle layer portion, and thereafter heating and stretching the film to obtain an oriented HDPE of high clarity film of improved moisture proof.

11 Claims, No Drawings

METHOD OF PRODUCING ORIENTED POLYETHYLENE FILM

BACKGROUND OF THE INVENTION

The present invention relates to an oriented polyethylene film and method for producing the film. In one aspect, the invention relates to high density polyethylene processed into a film by a method which imparts superior properties in moistureproofness and clarity to the film.

Heretofore, in spite of their many outstanding properties, films made of medium- and low-pressure polyethylene have been used very little in the application areas where a display effect is required, mainly because they are poor in clarity. There have been proposed several kinds of polyethylene film improved in clarity, which are produced by orienting a radiation-cured polyethylene film. Such film is good in clarity but is generally not satisfactory in moistureproofness. For example, for moistureproofness packaging, biaxially oriented polypropylene film (referred to as OPP hereinafter) is in general use at the present time. However, OPP is not necessarily satisfactory in the packaging area where high moistureproofness is required. Such requirements are met by increasing the thickness of OPP film or coating OPP film with vinylidene chloride. This leads to an increase in cost.

SUMMARY OF THE INVENTION

It has been discovered that by processing the polyethylene film to control the degree of cross linking across the thickness of the film, an improved film is obtained. The film exhibits improves moistureproof properties without sacrificing clarity. The invention resides in the film and the method of manufacture.

The method of the present invention broadly comprises (a) crosslinking a layer (i.e. film, sheet or tubular molding) of polyethylene resin in such a manner that the degree of crosslinking decreases across the thickness from both outer surfaces toward the middle, and (b) subsequently heating and stretching the crosslinked layer at conditions to orient the molecules in the layer producing an oriented film. The stretching preferably is at a temperature lower than the melting point of the polymer and in a direction(s) to produce uniaxial or biaxial orientation. The amount of stretch in each direction may vary within wide ranges but preferably is at least 300% in each direction. The oriented film thus produced has a water vapor transmission rate (Y) lower than a numerical value obtained from the following formula $$Y = 17 X^{-\frac{1}{2}}$$

(where Y represents the water vapor transmission rate (g/m$^2$/24 hours) and X represents the thickness ($\mu$) of the oriented film), and preferably has a haze value lower than 5%.

The polyethylene resin useful in the present invention is crystalline polyethylene produced by the medium- or low-pressure process. It has a density higher than 0.935 g/cc, preferably higher than 0.950 g/cc, and a melt flow index (referred to as MI herinafter) higher than 0.05 g/10 minutes, preferably 0.5 to 20 g/10 minutes. It also includes a mixture of the above-defined polyethylene and a small quantity of low-density polyethylene (i.e. LDPE or LLDPE) and/or other polyolefins. The polyethylene resin may be incorporated with a commonly used antioxidant, UV absorber, slip agent, antiblocking agent, antistatic agent, pigment, dye, etc.

DESCRIPTION OF THE PREFERRED EMBODIMENTS

The preferred polyethylene is high density polyethylene (HDPE) having a density greater than 0.940 g/cc and being substantially free of long-chain branching.

In the production of the oriented film of this invention, the polyethylene resin is fed to an ordinary extruder and formed into a flat or tubular stock sheet by melt extrusion, followed by cooling and solidification. The stock sheet may be obtained in the form of a flat sheet by extrusion from a conventional T-die or in the form of a tubular sheet by extrusion from an annular die. The flat stock sheet may also be obtained from a tubular stock sheet by cutting one edge or both edges of the lay-flat tube. The thickness of the stock sheet should be such that the sheet can be crosslinked so that the degree of crosslinking decreases across its thickness from both surfaces toward the middle. It is determined according to the draw ratio and the film thickness after stretching. It is usually 210 to 2000$\mu$, preferably 400 to 1000$\mu$. The thickness in this range is adequate to handle the stock sheet with ease and to accomplish the crosslinking as mentioned above.

According to this invention, the flat or tubular stock sheet of polyethylene resin should be crosslinked in such a manner that the degree of crosslinking decreases inwardly from each surface of the sheet reaching a minimum near the middle layer portion of the sheet. The degree of crosslinking is expressed in terms of gel fraction. The object of this invention is achieved when the degree of crosslinking in the stock sheet is such that the gel fraction is 0 to 5% in the middle layer portion where the degree of crosslinking is lowest and the gel fraction is 5% and up, preferably 20 to 70%, in the opposite surface layer portions where the degree of crosslinking is highest. The outer and middle layer portions may be provided by separate layers wherein the middle layer portion is not crosslinked (or merely lightly crosslinked) and the outer layers are crosslinked. In the case where the middle layer portion, in which the degree of crosslinking is lowest, (preferably a gel fraction of 0%), the thickness of each outer layer portion should be 0.1 to 10 times that of the middle layer portion, and preferably 0.2 to 8 times the thickness of the middle layer portion, and most preferably between 1:0.5:1 to 1:6.5:1. It is particularly preferable that the outer layer portions have the same degree of crosslinking.

If crosslinking is performed, in such a manner that the gel fraction in the middle layer portion, in which the degree of crosslinking should be lowest, is higher than 5%, the stock sheet can be stretched uniformly and improved in clarity, but the film having improved moistureproofness, which is an object of this invention, is not obtained. On the other hand, if crosslinking is performed in such a manner that the gel fraction in the outer layers is lower than 20%, the stock sheet cannot be stretched uniformly and the resulting film is not improved in clarity and moistureproofness. If crosslinking is performed in such a manner that the gel fraction in the outer layers exceeds 70%, the stock sheet tends to break during stretching and cannot be stretched smoothly. If crosslinking is performed in such a manner that the stock sheet is crosslinked uniformly across the thickness, the stock sheet can be stretched uniformly with improved clarity, but moistureproofness is not improved. The preferred maximum crosslinking produces gel fraction in the outer layer between about 40 to 70%. If crosslinking is performed in such a manner that only one of the outer layers of the stock sheet is crosslinked, the stock sheet tends to break during stretching. If crosslinking is performed in such a manner that the degree of crosslinking decreases unidirectionally across the thickness from one surface to the other, the resulting film is not satisfactorily improved in clarity and moistureproofness.

The gel fraction is the quantity in percent of the fraction that remains undissolved when a specimen is extracted in boiling p-xylene.

The above-mentioned crosslinking can be accomplished by irradiating both surfaces of a stock sheet with electron rays or by multilayer coextrusion in which the polyethylene for individual layers contains a different amount of crosslinking agent.

The dosage of irradiation with electron rays varies depending on the thickness of the stock sheet and the type, molecular weight, and molecular-weight distribution of polyethylene resin; but it is usually 5 to 50 Mrad, and preferably 15 to 30 Mrad. Both sides of the stock sheet may be irradiated at one time or one after the other, or repeatedly several times. Both sides should be irradiated with the same dosage. The penetrating power of electon rays should be properly adjusted according to the thickness of stock sheet by changing the applied voltage or by using a shield.

The dosage of electron rays can be adjusted in the following manner. Assume that a stock sheet, which is, say, 500-micron thick, is to be irradiated. Prepare a sample by tightly laying 25 pieces of 20-micron thick film on top of another and irradiate the sample from both sides thereof with the same dosage of electron rays. Take apart the crosslinked sample and measure the degree of crosslinking in the individual films. The result of measurements tells the degree of crosslinking which varies across the thickness of the sample. The thus obtained data reveals the relationship between the thickness of the stock sheet and the degree of crosslinking or the dosage or irradiation.

The irradiation with electron rays should preferably be carried out in the atmosphere of nitrogen, argon, helium, or other inert gas. Irradiation in the air is possible; but it results in films which are not satisfactorily improved in clarity.

The crosslinking by multilayer coextrusion is accomplished in such a manner that a polyethylene resin containing a crosslinking agent like an organic peroxide is fed to an extruder which forms both outer layers in the case of flat stock sheet or the inner and outer layers in the case of tubular stock sheet, and another polyethylene resin containing no organic peroxide or containing an organic peroxide just enough to achieve the minimum degree of crosslinking is fed to another extruder which forms the intermediate layer, and the polyethylene resins are coextruded and crosslinked at a temperature higher than their melting point.

The crosslinked stock is then stretched uniaxially or biaxially at a predetermined draw ratio by the conventional rolling, tentering, or tubular method. Biaxial orientation may be accomplished by either simultaneous stretching or sequential stretching.

The stretching temperature should be lower than the melting point of polyethylene resin, and preferably at a temperature higher than the softening point and lower than the melting point of polyethylene resin. Specifically, it is 70 to 135 degrees C., and preferably 100 to 130 degrees C. Uniform and stable stretching is impossible at a temperature lower than the softening point; and stretching at a temperature higher than the melting point results in an oriented film with sufficient moistureproofness, although uniform stretching is possible.

The draw ratio should be greater than 3 times (300%), and preferably greater than 4 times (400%), in one direction or in both longitudinal and lateral directions. When the draw ratio is lower than 3 times, uniform stretching is impossible and the resulting film is not sufficiently improved in moistureproofness and clarity. The film should preferably have a thickness between about 10 and about 50 microns.

The oriented film thus obtained has heat-shrinkable properties. If the oriented film is to be used as the substrate of composite film for packaging, it should be subjected to heat setting at a temperature, e.g., 110 to 140 degrees C., lower than the melting point of the oriented film, so that the heat-shrinkable in the lateral direction is reduced to 1.5% or less, preferably 1.0% or less.

The oriented polyethylene film produced according to the method of this invention exhibits improved moistureproof properties, and preferably has a water vapor transmission rate (Y) lower than a numerical value obtained from the formula $Y = 17X^{-\frac{1}{2}}$. Moreover, it preferably has a haze value lower than 5.0%, and it has such a sectional structure that the degree of crosslinking decreases inwardly across the thickness. It is one which has been stretched, preferably more than three times, in at least one direction. The specific value of the water vapor transmission rate is lower than 3.1 $g/m^2/24$ hours for a 30-micron thick film and lower than 5.4 $g/m^2/24$ hours for a 10-micron thick film. Thus the method of this invention provides a highly moistureproof film which cannot be obtained by the conventional methods. This high moistureproofness provides an economical advantage, because it is not necessary to thicken the film to obtain the desired moistureproofness. Moreover, the thin film is suitable for packaging and good in clarity. The oriented film of this invention has well-balanced strength and stiffness and a proper degree of heat shrinkage. After heat-setting, it shrinks only a little on heating and cuts like cellophane. These properties make the oriented film versatile. Particularly, it will be suitably used as the substrate film for packaging such items as medicines and laver which require a high degree of moistureproofness.

The invention is now described in more detail with reference to the following examples. The test methods employed to evaluate the film performance in the examples are given below.

(1) Water vapor transmission rate: In accordance with JIS Z-0208, at 40 degrees C. and 90% RH.
(2) Haze: In accordance with JIS K-6714.
(3) Tensile strength: In accordance with ASTM D882.
(4) Heat shrinkage: Measured after a specimen is placed in a constant temperature bath (air) at 120 degrees C. or 140 degrees C. for 10 minutes.
(5) Gel fraction: In accordance with ASTM D2765, Method A.

EXAMPLE 1

High-density polyethylene (density: 0.960 g/cc, MI: 5 g/10 minutes, melting point: 135 degrees C.) was formed into a 500-micron thick stock sheet by using a T-die extruder. Both sides of the stock sheet were irradiated with electron rays (165 kV-8 mA) at a dosage of 20 Mrad in the nitrogen gas atmoshpere by using ESI's apparatus.

The gradient of the degree of crosslinking across the thickness of the sheet was estimated in the following manner. Twenty-five pieces of 20-micron thick films were laid on top of another to make a 500-micron thick test specimen. The specimen was irradiated under the same conditions as mentioned above. After irradiation, the specimen was taken apart and the degree of crosslinking of individual films was measured. The maximum gel fraction was 50% in the outer layers, and the minimum gel fraction was 0% in the inner layer. The irradiated stock sheet was found to be composed of crosslinked outer layer/uncrosslinked inner layer/crosslinked outer layer, the ratio of their thicknesses being 1:0.5:1.

After heating to 127 degrees C., the irradiated stock sheet was stretched 4 times in the longitudinal direction and 4 times in the lateral direction sequentially by using a tenter-type biaxial stretching machine. Thus there was obtained a 30-micron thick oriented film having the properties as shown in Table 1.

EXAMPLES 2 TO 7

Polyethylene resins of different density and MI were formed into stock sheets, which were then crosslinked and stretched in the same way as in Example 1 under the conditions shown in Table 1. There were obtained different kinds of oriented films having the properties shown in Table 1.

COMPARATIVE EXAMPLE 1

High-density polyethylene (density: 0.957 g/cc, MI: 0.8 g/10 minutes, melting point: 134 degrees C.) was formed into a 500-micron thick stock sheet by using a T-die extruder. The stock sheet was irradiated with electron rays at a high applied voltage that provides sufficient penetrating power. Thus there was obtained a stock sheet which is uniformly crosslinked across the thickness thereof and has a gel fraction of 55%. The crosslinked stock sheet was stretched at 135 degrees C. 4 times in the longitudinal direction and then 4 times in the lateral direction sequentially. Thus there was obtained a 30-micron thick oriented film having a water vapor transmission rate of 4.0 g/m$^2$/24 hours and a haze value of 1.5%. The improvement of moistureproofness was not sufficient.

COMPARATIVE EXAMPLE 2

The stock sheet as obtained in Example 1 was irradiated in one direction across the thickness. The gel fraction was 50% in the outer layer facing to the radiation source, and the gel fraction was 0% in the opposite outer layer. The ratio of the thicknesses of the crosslinked layer to the uncrosslinked layer was 1:1.5. The stock sheet was stretched under the same conditions as in Example 1, but no oriented film could be obtained due to breakage.

EXAMPLE 8

An oriented film was prepared in the same manner as in Example 1, except that the dosage of irradiation was reduced so that the gel fraction in the irradiated outer layer was 5%.

The resulting oriented film had a water vapor transmission rate of 2.4 g/m$^2$/24 hours and a haze value of 32%. In other words, the film was very poor in clarity.

EXAMPLE 9

An oriented film was prepared in the same manner as in Example 1, except that the irradiation was performed in the air.

The resulting oriented film had a vapor transmission rate of 2.2 g/m$^2$/24 hours and a haze value of 5.5%. In other words, the film was not sufficiently improved in clarity.

What is claimed is:

1. A method for producing high clarity oriented polyethylene film which comprises
   (a) crosslinking opposite surfaces of a sheet of polyethylene selected from HDPE and blends of

TABLE 1

| Example | Polyethylene resin Density (g/cc) | Polyethylene resin Melt Index (g/10 min) | Thickness of stock sheet (μ) | Ratio of crosslinked layer: uncrosslinked layer: crosslinked layer | Gel fraction in crosslinked stock sheet Maximum (%) | Gel fraction in crosslinked stock sheet Minimum (%) | Gel fraction in crosslinked stock sheet Maximum (%) | Conditions for orientation Temperature (°C.) | Conditions for orientation Draw ratio* | Oriented film Thickness (μ) |
|---|---|---|---|---|---|---|---|---|---|---|
| 1 | 0.960 | 5 | 500 | 1:0.5:1 | 50 | 0 | 50 | 127 | 4 × 4 | 30 |
| 2 | 0.957 | 0.8 | 750 | 1:1.75:1 | 50 | 0 | 50 | 129 | 4 × 6 | 30 |
| 3 | 0.957 | 0.8 | 850 | 1:6.5:1 | 50 | 0 | 50 | 129 | 4 × 7 | 30 |
| 4 | 0.955 | 20 | 500 | 1:0.5:1 | 70 | 0 | 70 | 127 | 4 × 4 | 30 |
| 5 | 0.960 | 5 | 500 | 1:0.5:1 | 50 | 0 | 50 | 130 | 4 × 6 | 20 |
| 6 | 0.955 | 20 | 340 | 1:1.4:1 | 50 | 0 | 50 | 130 | 4 × 7 | 13 |
| 7 | 0.960 | 5 | 400 | — | 50 | 4 | 50 | 127 | 4 × 5 | 20 |

| Example | Water vapor transmission rate (g/m$^2$/24 hours) | Haze (%) | Tensile* strength (kg/cm$^2$) | Heat-shrinkage before heat setting (%)** | Heat-shrinkage after heat setting (%)*** |
|---|---|---|---|---|---|
| 1 | 2.1 | 2.3 | 1070 × 1220 | 75 | 0.8 |
| 2 | 2.4 | 2.7 | 870 × 1860 | 80 | 1.2 |
| 3 | 1.6 | 4.1 | 800 × 1950 | 82 | 1.4 |
| 4 | 2.5 | 3.5 | 870 × 1020 | 72 | 0.7 |
| 5 | 3.1 | 2.3 | 570 × 1000 | 78 | 0.7 |
| 6 | 3.5 | 2.5 | 600 × 980 | 83 | 1.0 |
| 7 | 3.6 | 2.0 | 1020 × 1310 | 77 | 1.1 |

Note to Table 1.
*Longitudinal direction × lateral direction
**In lateral direction, at 140 degrees C.
***In lateral direction, at 120 degrees C. Heat-setting was performed at 132 degrees C., with 1% relaxation in Examples 1, 4, and 5; with 5% relaxation in Example 7.

HDPE and a small quantity of at least one other polyolefin, said polyethylene having a density greater than 0.940 g/cm$^3$, in such a manner that the degree of crosslinking decreases from said surfaces inwardly to produce a sheet wherein opposite outer layer portions of the sheet each has gel fractions of between 20 to 70% and the middle layer portion of the sheet has gel fractions between 0 to 5%, said outer and middle layer portions having substantially the same polyethylene composition; and (b) heating and stretching the crosslinked sheet under conditions to orient the polyethylene molecules thereby producing an oriented film having a thickness between 10 and 50 microns.

2. The method as defined in claim 1 wherein the polyethylene is HDPE.

3. The method of claim 1 wherein the sheet is a monolayer and the crosslinking step comprises exposing opposite sides of the sheet to irradiation in an inert environment under conditions which result in the inward decreasing crosslinking, each of said outer layer portions achieving highest degree of crosslinking and said middle portion achieving the lowest degree of crosslinking.

4. The method as defined in claim 3 wherein the outer layer portions and the middle layer portion are contiguous and the thickness ratio of the outer layer portion:middle layer portion:outer layer portion thereof ranges between 1:0.1:1 to 1:10:1.

5. The method as defined in claim 4 wherein said ratio is between 2:1:2 and 8:1:8.

6. The method as defined in claim 4 wherein the sheet has a thickness of from 210 to 2000 microns and the stretching at least in one direction is at least 300 percent.

7. A method of producing an oriented film which comprises:
(a) crosslinking by irradiation in an inert environment a monolayer sheet of a polyethylene selected from HDPE or blends of HDPE and a small quantity of at least one other polyolefin, said polyethylene having a density higher than about 0.940 g/cc and a thickness of between 210 and 2000 microns, to produce opposite outer layer portions each having a gel fraction between 20% to 70% and a middle layer portion having a gel fraction between 0 and 5%;

(b) stretching the crosslinked sheet in at least one direction at least 300% its original length to produce a clear oriented film of improved moistureproof.

8. The method as defined in claim 7 wherein at least a portion of the middle layer portion has a gel fraction of 0%.

9. The method as defined in claim 7 wherein the oriented film has a haze value of less than 5%.

10. The method of claim 1 wherein the outer layer portions and the middle layer portion are separate layers laminated together by coextrusion and wherein the outer layer portions are crosslinked by use of crosslinking agent prior to coextrusion.

11. The method of claim 7 wherein the polyethylene is HDPE.

* * * * *